Feb. 19, 1963 V. L. PEICKII ETAL 3,077,637
METHOD FOR MAKING MULTIPLE-LIP SEALS
Original Filed Dec. 15, 1958 3 Sheets-Sheet 1

Feb. 19, 1963 V. L. PEICKII ETAL 3,077,637
METHOD FOR MAKING MULTIPLE-LIP SEALS
Original Filed Dec. 15, 1958 3 Sheets-Sheet 2

Feb. 19, 1963　　　V. L. PEICKII ETAL　　　3,077,637
METHOD FOR MAKING MULTIPLE-LIP SEALS
Original Filed Dec. 15, 1958　　　3 Sheets-Sheet 3

United States Patent Office 3,077,637
Patented Feb. 19, 1963

3,077,637
METHOD FOR MAKING MULTIPLE-LIP SEALS
Vasalie L. Peickii, Hillsborough, Andrew M. Seemann, San Jose, and Robert N. Haynie, Mountain View, Calif., assignors to Federal-Mogul-Bower Bearings, Inc., Detroit, Mich., a corporation of Michigan
Original application Dec. 15, 1958, Ser. No. 780,479. Divided and this application Sept. 21, 1959, Ser. No. 846,523
3 Claims. (Cl. 18—55)

This invention relates to a method for making multiple-lip seals, more particularly, unitary, i.e., single-molded seals having a plurality of thin wafer-like lips, each of which is generally rectangular in cross-section. This application is a division of application Serial No. 780,479 filed December 15, 1958.

For many years, bearings have been protected from dirt by wafer-like annular seals of the type having a lip with a generally rectangular cross-section. To make multiple-lip seals, a number of these wafers have been stacked together and clamped into an outer case. The use of more than one lip has helped to keep dirt, water, and other foreign matter of of bearings and similar equipment. However, this method of making multiple-lip wafer seals has had many disadvantages and the product has not been fully satisfactory. The method, obviously, is cumbersome, for each lip has been made separately, the outer case has been made separately, and the assembly has been another separate operation. Moreover, due to the separate molding of each wafer, concentricity of all parts has been difficult to attain. Again, if the assembled stack was not clamped tightly enough, leakage became possible between successive wafers or between the wafers and the case. It was difficult to maintain close tolerances, and production was not consistent and precise.

All the disadvantages of seals that are assembled from a plurality of separate elements are eliminated by the unitary multiple-lip seal resulting from this invention. The cost of performing separate operations has been eliminated by molding the seal, with as many lips as desired in a single operation. Concentricity is assured since all the lips are molded simultanously in the same mold and are attached to each other by an integral body or web. There can be no leakage since the lips are all part of the same body and that body is molded to its case. The variations which occurred from part-to-part when wafers were assembled—especially when the wafers came from different molds, but also when parts from the same mold were assembled in different orientations—have been eliminated by this invention. Close tolerances are easily maintained, and production is consistent, uniform, and precise.

Difficulties were experienced in achieving manufacture of unitary multiple-lip seals and had to be overcome in order to perfect the present invention. The manufacture of single-lip seals was a relatively simple matter, but to mold a plural-lip seal in one operation was difficult and became increasingly so as the number of lips was increased; in fact, the manufacture of seals having more than two wafer-type lips has heretofore not been attempted, so far as is known. The questions of mold parting, mold filling, flash in awkward locations, and stripping the article from the mold without damage had to be answered in new ways.

For example, gas is emitted during the molding of synthetic elastomers. Unless this gas is vented away from the lip-forming cavities it will prevent the cavities from being filled, thereby producing voids or ragged lips. Improper venting leads to the formation of flash along the corners of the lips, and this flash would have to be ground or trimmed away to give a satisfactory product, for the rectangular sealing edge of the lip has to be sharp and flash-free. Heretofore, there has been no adequate way of venting the interior of a mold for plural-type wafer-lip seals without causing flash at extremely undesirable locations and without producing inaccurate molding.

Furthermore, although it is not difficult to design a mold with a cavity that is shaped to provide several lips, it is difficult to provide a mold from which a multiple-lip seal can be stripped without damage, especially when the mold is intended to be used in large-scale production where thousands of seals are made each day.

In order to overcome all these difficulties and make the production of single-molded, multiple-lip wafer seals feasible on a large scale, the present invention provides a novel method. The invention makes it possible to mold seals with any desired number of lips, all molded simultaneously and with assurance that each lip is of high quality and substantially rectangular in cross-section, so that when the seal is installed on a shaft there will always be a sharp corner where the lip engages the shaft, to prevent leakage of dirt, water, and other materials into the seal.

This invention effects an important reduction in the cost of plural-lip seals, eliminates the assembly of several component parts, and leads to a much more precise product with outstanding performance advantages.

Another important advantags of the method of this invention is that it utilizes the hydraulic pressure of the synthetic material being molded to assure against leakage of the material from the mold.

Other objects and advantages of the invention will appear from the following description of some preferred embodiments thereof.

Figures 1, 2:
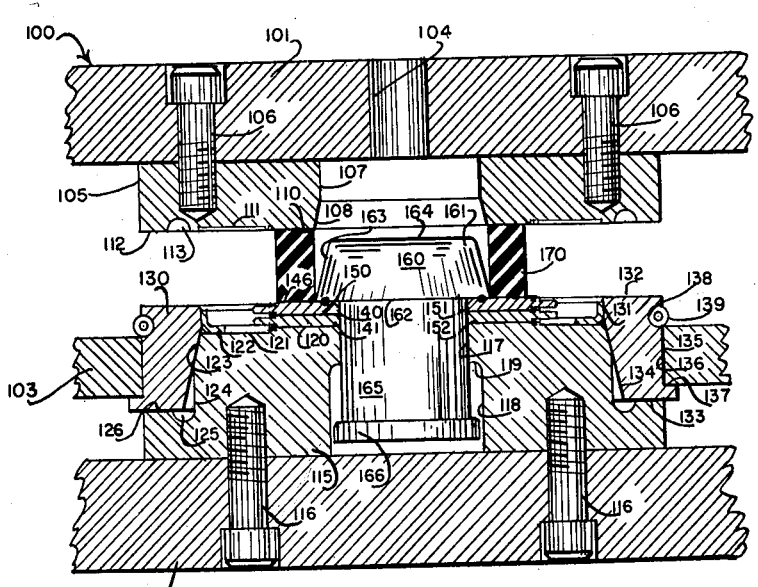
FIG. 1 is a view in elevation and in section of a mold by which the method of this invention may be practiced, the mold being shown in its open position just before molding.
FIG. 2 is a view similar to FIG. 1 of the mold shown in its closed position during molding.

*A Mold 100 for Making the Seal 10 (FIGS. 1-4)*

FIGS. 1-4 show a mold 100 whose elements are supported by a top platen 101, a bottom platen 102, and an intermediate ring 103. The top platen 101 has a central axial opening 104. An upper mold element 105 is secured to the platen 101 by bolts 106 and has a central opening 107 of larger diameter than the opening 104 and with a tapered lower end 108. The element 105 has a radially inner lower surface portion 110, an upwardly stepped central lower surface portion 111, and a radially outer lower surface portion 112, which has an overload-receiving recess 113. The portion 111 is stepped up from the portions 110 and 112 an amount equal to half the thickness of the lip to be formed thereby.

A lower mold element 115 is secured to the bottom platen 102 by bolts 116. It has a central opening 117 joined to a lower wider portion 118 by a shoulder 119. Its upper surface comprises a radially inner portion 120, a downwardly stepped central portion 121, and a still further downwardly stepped radially outer portion 122. The portion 122 ends at a nearly vertical tapered rim 123 which is succeeded by a substantially vertical cylindrical wall 124. The wall 124 is joined by an overload-receiving recess 125 to an outer radial shoulder 126.

The ring 103 supports an annular intermediate element 130 that defines the outer periphery of the mold cavity by its cylindrical wall 131. The upper radial surface 132 of the element 130 seats against the surface 112, while its lower radial surface 133 seats against the radial shoulder 126 and is joined by a tapered frusto-conical wall 134 to the wall 131, the upper portion of the wall 134 mating against the identically sloped rim 123. The outer wall 135 of the element 130 mates against the inner rim 136 of the ring 103 and is provided with a supporting shoulder 137 therefor. It also has a recess 138 to receive a standard coil spring 139 of the garter type, which helps to hold the element 130 in place against vertical movement relative to the ring 103.

An important feature of the mold 100 is the novel use of inserts or washer-like rings 140, 141, etc., in any desired number, corresponding to one less than the number of sealing lips of the seal 10, all of which have sharp rectangular edges and in all of which flash is confined at the most to the center lines of the lips. Thus, each washer 140, 141 (see FIG. 4) has its radially outer portion formed with upper and lower surfaces 142 and 143 that are joined by a rectangular step 144, 145 to the main washer surfaces 146 and 147, the height of the step 144, 145 being equal to half the thickness of the lips. Overload cavities 148, 149 are provided to the surfaces 146, 147 opposite similar cavities in the surfaces against which they mate.

The effect is that there are mold part lines 150, 151, 152 only at the center lines of the lips, not at their edges. Moreover, the part lines 150, 151, 152 serve to vent gas from the centers of the cavity portions that form the lips. They thus assure accurate filling and yet locate the flash where it will not be objectionable.

The inserts or rings 140, 141, etc., are held in place by a toad-stool-like plug member 160 having an enlarged upper end or head 161. The head 161 has a flat annular lower surface 162 that is brazed to the top insert ring 140, and a frusto-conical rim surface 163 that mates with the conical bore portion 108. The top surface 164 of the head 161 is thereby always spaced below the upper platen 101. The plug 160 has a stem 165 at the lower end of which a flange 166 is secured by a bolt 167, and engages the shoulder 119 when the molded part is stripped from the mold 100.

Thus, when the mold 100 is closed, (FIG. 2) the upper mold element 105 bears against the plug 160 and forces it to hold the inserts 140, 141 down snugly on each other and on the lower element 115. Later, when the upper element 105 moves up as the mold 100 opens, the plug 160 can move up with it a limited distance, and the inserts 140, 141 can also move up as they are stripped from the molded seal 10 (FIG. 2), the insert 141 separating from the insert 140.

The mold faces are all hardened, ground and lapped. This achieves very excellent seating and minimizes the flash between the mold elements, but does not prevent and in fact aids in the escape of the gas which forms when the synthetic elastomer material is being cured. Gas which forms could not be taken away through a solid mold, but is carried away at the parting lines 150, 151, 152 at the center of each lip.

Figure 5:
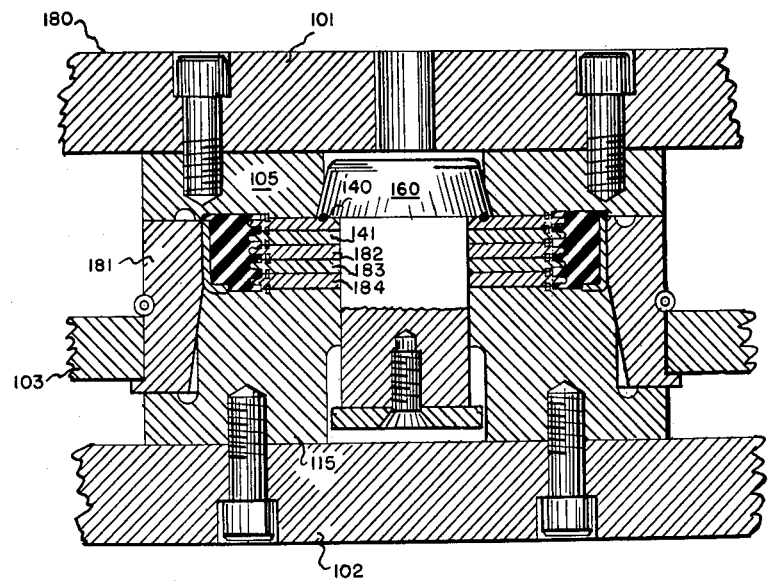
FIG. 5 is a view similar to FIG. 2 of a modified form of mold.

This point cannot be accented too much. Great difficulties were experienced when using solid molds. The lips would not be sharp and the molds would not fill. Some samples might be made successfully, but when production runs were attempted there were too many rejects; too many instances in which the lips were imperfect. Some types of rubber compound gave a fair degree of satisfaction, but most compounds gave unsatisfactory results because of gas producing voids in the lips when a solid mold was used. The cavity did not completely fill; the lip was uneven, and the sealing results were unsatisfactory. The present invention overcomes this difficulty since the gas escapes in between the inserts 140, 141 and in between the inserts 140, 141 and the mold elements 105 and 115. Furthermore, the present invention makes it possible to apply any desired number of lips, as shown in FIG. 5, by simply using more inserts, and in every instance, the proper disposition of the gas is assured.

It will be noted that the inserts 140, 141 are left loose in between the mold sections to better assure passage of the gas. It will also be noted that the lost motion connection provided by the plug 160 is useful during the stripping action.

Another important feature of the invention is the application of the stock. The stock, in the form of a ring 170 (FIG. 1) is loaded in on the top surface 146 of the upper insert 140, around the plug 160 and is compressed under pressure when the mold is closed. Heat is applied to both the top and bottom platens 101, 102 and is transmitted therethrough to all the parts of the mold 100. When the mold is closing, the upper element 105 moves down relative to the lower element 115 and compresses and partially liquifies the stock 170. The mold structure results in applying resultant hydraulic pressure of the stock to hold the inserts 140, 141 together and against the mold elements 105, 115. As the pressure increases, the pressure holding the mold parts together increases, and this hydraulic pressure is an outstanding result of the present invention. It gives an action like a check valve, for it is impossible for the fluid to split the mold apart and increase the amount of flash. When the faces are properly ground and lapped, the flash is insignificant.

Figure 3:
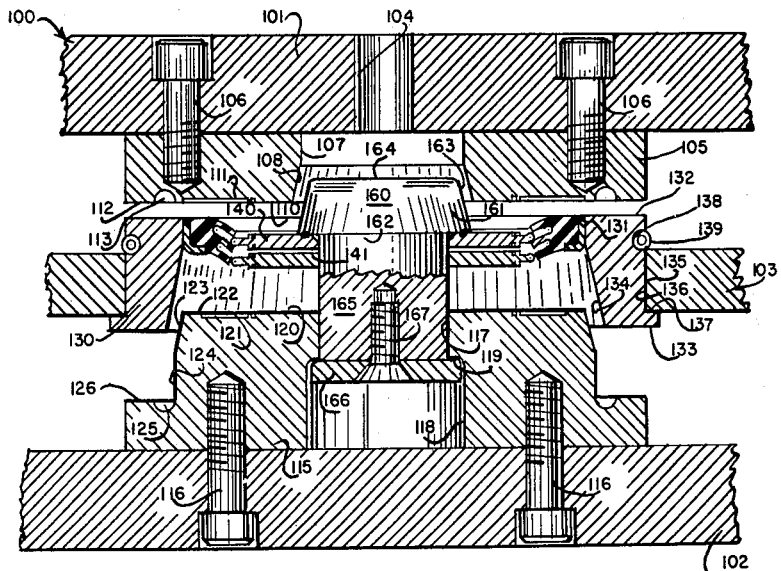
FIG. 3 is a view similar to FIG. 1 showing the mold in its stripping position with a molded seal being stripped therefrom.
Figure 4:
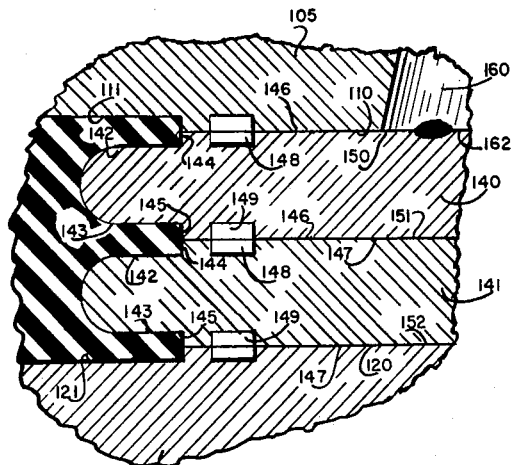
FIG. 4 is a fragmentary view in elevation and in section of a portion of the mold, showing the insert rings on an enlarged scale.

In operation then, the steel reinforcing member or flanged case of the seal 10 is inserted into the open mold (FIG. 1) against surfaces 122 and 131, and the ring 170 of prep stock is inserted into the mold around the plug 160 and on the upper surface of the upper insert 140. The mold 100 is then closed under heat and pressure, as shown in FIG. 2, and the synthetic elastomer flows under hydraulic pressure, both holding the mold closed and filling the mold cavity. Gas escapes out at the part lines, all of which are in non-critical locations. Any flash forms at these points only, and therefore very sharp rectangular lips are assured. After the elastomer has been cured, the mold 100 is opened and the seal 10 is stripped, as shown in FIG. 3, the elastomer flexing readily and separating as the inserts 140, 141 are lifted from the cavity.

*The Mold of FIG. 5*

There is no problem whatever in making seals with any number of lips, for additional insert rings may be added, as desired. FIG. 5 shows, by way of example, a mold 180 for making a six-lip seal. The only changes are in the height of the ring element 181 that replaces the ring 130, and in the additional number of insert washers 182, 183 and 184 used with the washers 140 and 141. The operation is substantially identical to that already described.

*Modified Form of Mold for Edge-Locating the Flash (FIG. 6)*

Figure 6:
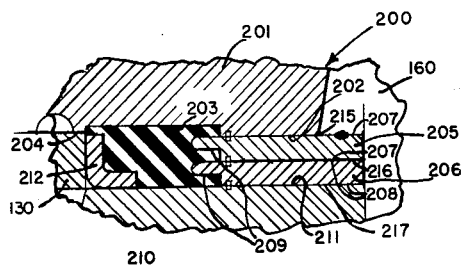
FIG. 6 is a fragmentary view on an enlarged scale of a portion of a modified form of mold in its closed position.

When the flash is not to be located along the center lines of the lips, the mold is slightly different. FIG. 6 shows a portion of a modified form of mold 200, with an upper element 201 having a lower surface with a radially inner portion 202, an upwardly stepped intermediate portion 203 and a radially outer portion 204. The step between portions 203 and 204 is for the full axial width of the lip to be molded.

Each insert ring 205, 206 has a generally flat upper surface 207, with the usual overflow cavities. Their lower surfaces 208 are stepped upwardly to form an offset radially outer portion 209 that lies the full height of the lip above the surface 208.

The lower mold element 210 has a generally flat upper surface 211 except near the edge of the inner case 212, where a step 213 serves to form a groove to protect the bond against breaking open when the seal is stripped. There is a ring 130 and plug 160 as before.

Operation and method are identical, except for the formation of flash, which takes place at part lines 215, 216 and 217.

Where no outer case is to be used, the mold structure is reversed to locate the flash on the opposite sides of the lips from the inner case.

To those skilled in the art to which this invention relates, many additional changes in construction and widely differing embodiments of the invention will suggest themselves without departing from the spirit and scope of the invention as defined in the claims.

What is claimed is:

1. A method for molding multiple-lip integral shaft seals of the radial type comprising, applying a compressive force at high temperature through an elastomeric stock against one of the end members of a stack of annular concentric plate-like members in surface contacting relation having their peripheral margins axially spaced from each other to form annular radially extending lip-forming cavities to thus induce flow of the stock from said one end plate-like member to a location about the peripheries of the members and radially of the stack toward the open ends of the cavities while peripherally confining the stock about the stack to permit escape of gas from between the surfaces of the members, and continuing the application of said force directly against the stock and members to prevent parting of the members in an axial direction as the lips of the seal are compressed against the end walls of the cavities.

2. A method for molding multiple-lip integral shaft seals as defined by claim 1 in which only one surface of each of the peripheral margins of the respective members lies below the respective like-facing surfaces of the members.

3. A method for molding multiple-lip integral shaft seals as defined by claim 1 in which both surfaces of the peripheral margin of each member lie below the respective surfaces of the members.

References Cited in the file of this patent

UNITED STATES PATENTS

| | | |
|---|---|---|
| 1,542,799 | Midgley | June 16, 1925 |
| 1,615,473 | Midgley | Jan. 25, 1927 |
| 2,133,019 | Campbell | Oct. 11, 1938 |
| 2,148,079 | Martin | Feb. 21, 1939 |
| 2,248,060 | Brundage | July 8, 1941 |
| 2,756,460 | Heintz | July 31, 1956 |